July 19, 1938.                    J. SALM                    2,124,152
                                 FISH LURE
                            Filed Nov. 3, 1934
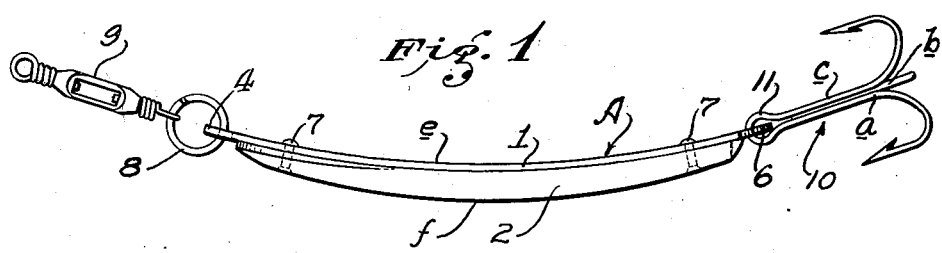
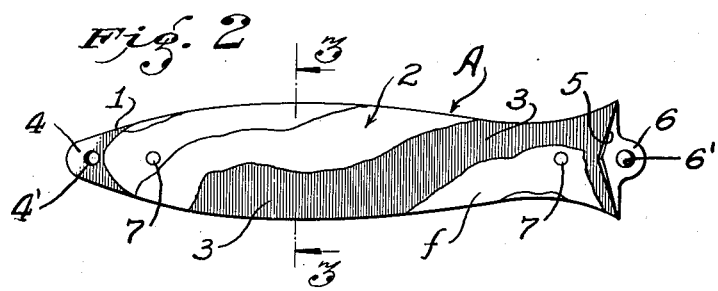
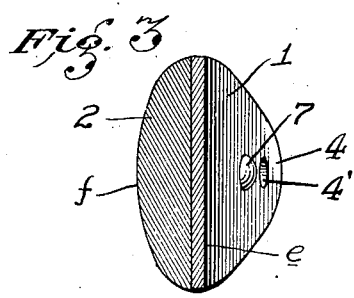
INVENTOR
John Salm
BY
his ATTORNEY.

Patented July 19, 1938

2,124,152

UNITED STATES PATENT OFFICE 2,124,152

FISH LURE

John Salm, Torrance, Calif.

Application November 3, 1934, Serial No. 751,368

4 Claims. (Cl. 43—42)

This invention relates to fish lures that may be used in lieu of other bait, and either for trolling or casting purposes.

An object of this invention is to provide a novel fish lure that upon its being drawn through the water will "dart" from side to side, in very much the same manner as a live minnow or other small fish may swim quickly to one side of a straight course and then to the other side of such course.

An object is to provide a novel fish lure which when drawn through the water will act in a manner substantially different from that of "spoons" and "spinners" heretofore used.

Another object is to provide a novel fish lure which will have the above characteristics and which may combine a silvery metallic appearance with an iridescent surface.

Another object is to provide a novel fish lure wherein, a silvery metallic lustre and an iridescent surface having portions thereof in colors particularly attractive to fish may be alternately exposed from side to side as the lure is drawn through the water.

A still further object is to provide a novel fish lure of the above characteristics which will in itself provide sufficient sinking weight so that additional weights or sinkers are not ordinarily required, although they may be used if desired.

A still further object is to provide a novel fish lure which will facilitate the use of curved abalone shells in conjunction therewith and which will be of sufficient strength to withstand the impact of a fish striking the same, and the subsequent pull that may be exerted by a fish caught upon the lure.

This invention embodies improvements over the fish lure described and claimed in my copending application filed December 26, 1933, Serial No. 703,906.

The invention comprises the parts and combinations and arrangements of such parts as more fully hereinafter described and pointed out in the appended claims.

Other objects, advantages and features of invention may appear from the accompanying drawing, the subjoined detail description and the appended claims.

The accompanying drawing illustrates the invention in a form I at present deem preferable.

Figure 1 is a top or bottom edge view of a fish lure constructed in accordance with my invention, and having a link and swivel and gang hook associated therewith.

Fig. 2 is a side elevational view thereof, looking at the side provided with an iridescent surface, and with the link and swivel and gang hook removed.

Fig. 3 is a transverse sectional view, on an enlarged scale, and taken on line 3—3, Fig. 2, and looking in the direction of the arrows.

My novel fish lure A comprises an elongate metallic body or plate member 1 that is cut in outline to simulate the shape of a minnow or small fish and such body member 1 is curved, or convexed or concaved depending on which side it is viewed, throughout substantially its entire length or its longitudinal axis and being of a configuration transversely of the body member that if a plane were passed through the body member at right angles to its longitudinal axis the intersection of the plane with the body would be substantially a straight line coincident with a substantially straight line lying in the upper or exposed surface e of the body member 1. The body member 1 is preferably formed of a non-corrosive metal, such as nickel silver so that its exposed surface will give a silvery or shiny metallic lustre to one side of the lure. By making the body member 1 of a predetermined thickness, commensurate with the size of the lure, sufficient weight is obtained to provide the requisite sinking qualities therefor so that additional weights or sinkers may be dispensed with, and still not detract from the appearance or shape of the lure.

A side member 2 formed of a naturally iridescent substance, such as abalone shell, is preferably secured to the convex side of body member 1 by any suitable means such as by the rivets 7. The side member 2 is preferably curved to closely fit the side of the body member 1 to which it is attached, and the natural abalone shell from which it is preferably formed is provided with streaks or regions of various colors, among which is often a region of red, indicated by the shading 3 in Fig. 2. I preferably select a piece of iridescent substance that has such red region or regions thereon as such color is particularly attractive to a great variety of fish.

The side member 2 substantially entirely covers one side of the body member 1 and conforms to the periphery thereof, except at each end thereof. The body member 1 projects from the forward end of side member 2 to provide a tang 4 provided with an opening 4' to which the line, not shown, or a ring or link 8 having a swivel 9 attached thereto may be connected. The rear end of body member 1 is provided with a protruding tang 6 and the side member 2 is notched in a V-shape at such end, as at 5, to simulate the tail of a fish, and such notch 5 partially embraces tang 6 so that the gang hook 10 may be secured as closely as possible to the body of the lure.

The side member 2 is substantially semi-elliptical in cross section due to its being rounded at its periphery as shown in Fig. 3, and its exposed surface is preferably polished to a high lustre.

The ring or link 8 may be of any suitable construction and is preferably a split or "key ring" which in turn is connected to one end of the common swivel fitting 9, the other end of which is connected in the conventional manner to a fish line.

The gang hook 10 is preferably of the split type having two shanks a, b secured together and a third shank c free of the other shanks a, b and provided with a loop 11 that is received in the recess 6' provided in tang 6.

In practice it has been found that by curving the body member longitudinally from end to end and having its exposed side e constructed as hereinbefore described, that as the lure is drawn through the water the lure will not spin or revolve as is customary with "spinners" and "spoons" but that the action will be for the lure to strike out in a direction at an angle to the pull of the line thereon and after going a short distance it will shift and strike out at an opposite angle to that previously taken, so that it may be said the lure travels in an erratic side to side movement, or "darts" first to one side and then to the other, thereby closely simulating the movement of a live minnow attempting to escape.

The longitudinal curvature of the body member 1 also serves to facilitate the use of the curved portions of the abalone shell with a maximum of economy.

From the foregoing it will be seen that I have provided a fish lure that will present a combined metallic and iridescent lure in that one side of the body member 1 is exposed to present a shiny metallic surface e and the other side of the body member 1 will present an iridescent surface f that is also provided with red portions 3 thereby adding greatly to the value of the article as a lure to many varieties of fish, some of which may be attracted by the metal, and others by the iridescent surface, and still others by the red portions on the lure.

Although I have shown my fish lure as being a combined metallic body member 1 and an iridescent side member 2, I do not wish to be limited to the specific structure shown as the metallic body member 1 without the side member 2 will form an attractive fish lure that will act as above contemplated, and various other changes, and modifications may suggest themselves to one skilled in the art, without departing from the spirit of the invention herein described and pointed out in the appended claims.

From the foregoing it may be said that I have provided a novel fish lure which comprises an elongated body member curved throughout substantially its entire length and being of a configuration transversely of such length that a plane passing through the body at right angles to the longitudinal axis thereof will intersect the upper surface e of the body member 1 in a straight line, and in which the lower surface f of said body is substantially semi-elliptical in cross section.

I claim:

1. A fish lure comprising an elongated member curved throughout substantially its entire length and being of a configuration transversely such that a plane passing through the body at right angles to the longitudinal axis thereof will intersect the upper surface of the body in a straight line, the lower surface of said body being substantially semi-elliptical in cross section.

2. A fish lure comprising an elongated metallic body member curved throughout substantially its entire length and being of a configuration transversely such that a plane passing through the body at right angles to the longitudinal axis thereof will intersect the upper surface of the body in a straight line, and an iridescent side member secured to the lower surface of said body member and being substantially semi-elliptical in cross section.

3. A fish lure comprising an elongated metallic body member curved throughout substantially its entire length and being of a configuration transversely such that a plane passing through the body at right angles to the longitudinal axis thereof will intersect the upper surface of the body in a straight line, a side member secured to said body member, said side member substantially conforming to the periphery of said body member throughout its entire area, and tangs extending from each end of said body member.

4. A fish lure comprising an elongated metallic body member having an outline to simulate the shape of a minnow and being of a configuration transversely such that a plane passing through the body at right angles to the longitudinal axis thereof will intersect the upper surface of the body in a straight line; and a naturally iridescent side member secured to and substantially covering the lower surface of said body member, said side member being curved along its longitudinal axis to conform to the lower surface of said body member, the exposed side of said side member being rounded at its longitudinal peripheral edges.

JOHN SALM.